US 6,722,396 B1

(12) United States Patent
Sillat et al.

(10) Patent No.: US 6,722,396 B1
(45) Date of Patent: Apr. 20, 2004

(54) METHOD FOR FILING, CLEANING AND EMPTYING LARGE VOLUME GAS CONTAINERS, ESPECIALLY AIRSHIPS

(75) Inventors: Diethard Sillat, Martinsried (DE); Thomas Sauer, Frankfurt am Main (DE)

(73) Assignee: Thomas C. Sauer, Frankfurt (DE)

( * ) Notice: Subject to any disclaimer, the term of this patent is extended or adjusted under 35 U.S.C. 154(b) by 0 days.

(21) Appl. No.: 10/031,437

(22) PCT Filed: Jul. 18, 2000

(86) PCT No.: PCT/EP00/06865
§ 371 (c)(1),
(2), (4) Date: May 10, 2002

(87) PCT Pub. No.: WO01/05653
PCT Pub. Date: Jan. 25, 2001

(30) Foreign Application Priority Data

Jul. 20, 1999 (DE) .......................... 199 34 015

(51) Int. Cl.⁷ .............................. B05B 31/00; B64B 1/58
(52) U.S. Cl. ................. 141/4; 141/10; 141/37; 141/47; 141/54; 141/59; 244/98
(58) Field of Search .................. 141/4, 11, 10, 141/37, 39, 44, 45, 47, 49, 52, 54, 59, 69, 83, 98, 313–317; 244/98

(56) References Cited

U.S. PATENT DOCUMENTS

| 1,549,061 A | * | 8/1925 | Chenu ........................ 244/98 |
| 4,012,016 A | * | 3/1977 | Davenport ................... 244/97 |
| 5,368,067 A | | 11/1994 | Cook, Jr. |
| 5,454,408 A | | 10/1995 | DiBella et al. |
| 6,408,902 B1 | * | 6/2002 | Liau ........................... 141/313 |

FOREIGN PATENT DOCUMENTS

DE            403834         10/1924

* cited by examiner

Primary Examiner—Gregory Huson
Assistant Examiner—Peter deVore
(74) Attorney, Agent, or Firm—Crowell & Moring LLP

(57) ABSTRACT

A method in which large-volume gas containers, for example, airships having a gas holding capacity of, for example, 400,000 m³, can be filled with a process gas, includes first completely filling the container with an auxiliary gas, the density of which differs from that of the process gas. The process gas is then quiescently introduced into an upper area of the gas container in such a way that no significant mixing with the air occurs and, at the same time, the auxiliary gas is removed by suction from the lower area of the gas container. To purify the contents of the gas container, purified or fresh process gas is quiescently introduced into the upper area of the gas container in such a way that no significant mixing with the contaminated process gas present in the gas container. At the same time, the contaminated process gas is removed by suction from the lower area of the gas container. To empty the gas container, the above-described process is reversed. The process gas is removed by suction from the upper area of the gas container, while air is simultaneously quiescently introduced into the lower area of the gas container in such a way that no significant mixing with the process gas occurs. In order to obtain a rapid exchange of the filling in the gas container, the gas is preferably intermediately stored in several compressed gas storage tanks.

19 Claims, 1 Drawing Sheet

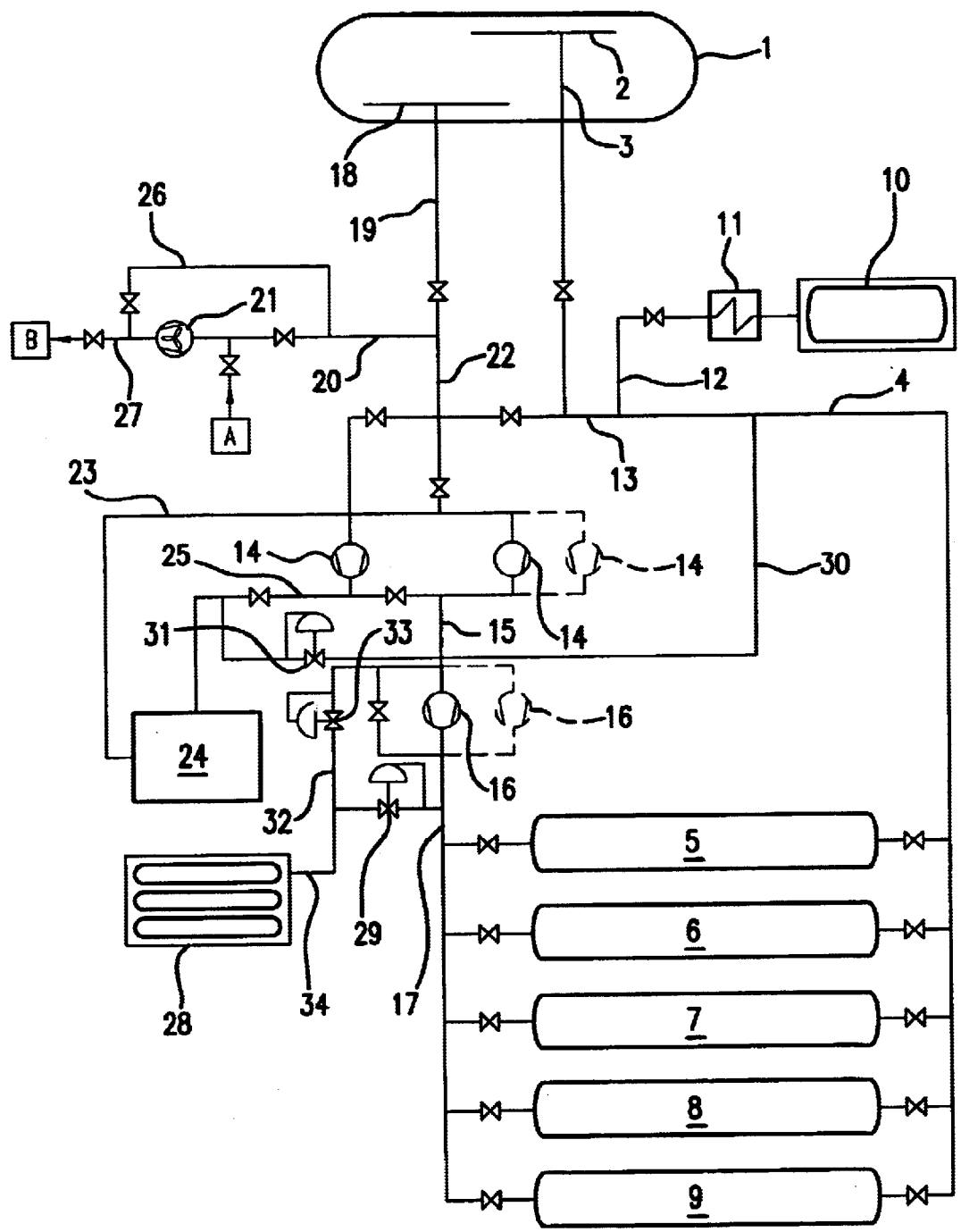

METHOD FOR FILING, CLEANING AND EMPTYING LARGE VOLUME GAS CONTAINERS, ESPECIALLY AIRSHIPS

BACKGROUND AND SUMMARY OF INVENTION

The invention relates to a method for filling large-volume gas containers, especially airships, with a process gas, as well as a method for purifying the process gas contained in such a gas container, and a method for emptying such gas containers.

In recent years, the forgotten field of airship navigation has regained some of its former popularity. Airships filled above all with helium have been proposed for a multitude of possible applications, especially for transporting heavy loads. Naturally, airships of this kind must first be filled with the gas required to lift them, for example, helium. In this patent application, the gas used to fill the gas container will be referred to as process gas. After a certain period of operation, contaminants will appear in the process gas inside the airship, which effect a reduction in uplift. For example, a contamination of the helium filling with a 5% fraction of air corresponds to a 5% reduction in uplift with respect to a filling that contains nearly 100% pure helium. For this reason, the process gas filling in the airship must be periodically purified. Ultimately, the airship will also have to be emptied, for example, for maintenance. For small and medium-sized airships with up to approx. 6,000 m$^3$ gas holding capacity, the filling or refilling is ordinarily implemented from gas cylinder transport vehicles, so-called cylinder trailers. For larger airships with a gas holding capacity of more than 6,000 m$^3$ (for example, 400,000 m$^3$) it has thus far been impossible to supply this quantity of gas within a short enough period of time. Excessively long down times for filling, purifying, and refilling of the airship could hamper the cost effectiveness of this type of transportation system.

It is thus the object of this invention to provide a method of filling, purifying, and emptying gas containers, via which even very large gas containers can be filled, purified, and emptied within a cost-effective period of time.

This object is attained in terms of the filling of the gas container, in that the gas container is first filled with an auxiliary gas, which possesses a higher or lower density than the process gas. The process gas to be used for the actual filling of the container is then introduced in such a way that no significant mixing with the auxiliary gas occurs, wherein, if the density of the process gas is lower than that of the auxiliary gas, the process gas is introduced into the upper area of the gas container while at the same time the auxiliary gas, or a mixture of auxiliary gas and process gas, is removed via suction from the lower area of the gas container. In contrast, if the density of the process gas is higher than that of the auxiliary gas, the process gas is introduced into the lower area of the gas container, and the auxiliary gas, or a mixture of auxiliary gas and process gas, is simultaneously removed via suction from the upper area of the container.

As was mentioned above in the introduction to the description, in this patent application, the gas that is actually used to fill the gas container will be referred to as process gas. Especially for the use in airships, a gas or gas mixture that has a lower density than air, preferably helium, hydrogen, or a mixture of helium-hydrogen is used as process gas.

The auxiliary gas, which serves only to support the filling or emptying process, is to be differentiated from this process gas. Basically, the auxiliary gas that is used possesses a higher or lower density than the process gas, with the difference in densities between the auxiliary gas and the process gas preferably amounting to at least 15%. Especially when filling and emptying airships, a gas or gas mixture having a density that is the same as or higher than air is used as the auxiliary gas. In the simplest case, the auxiliary gas is comprised of air. Expediently, the gas container is completely filled with the auxiliary gas before the process gas is introduced.

Under a quiescent introduction of the process gas it is to be understood that, to the greatest possible extent, no or very slight turbulent gas streams are produced in the gas container, which would cause the process gas being introduced to mix with the gas already present in the gas container. The flow rate, the inflow cross section, and the point of introduction are selected purposely so that a turbulence of the introduced process gas can be excluded. Only the quantity of auxiliary gas that is drawn, for example, from the lower area of the gas container is replaced with the process gas that is introduced, for example, in the upper area of the gas container.

The exchange of gases is preferably implemented as quickly as possible, in order to keep the diffusion of the two media at an insignificant level. Expediently, the exchange of gases takes less than 20 hours.

When the process gas is introduced into the gas container, a mixing zone forms as a result of physical effects (for example, diffusion, convection), in which the process gas and the auxiliary gas become mixed with a concentration drop within the mixing zone. In the case wherein the density of the process gas is lower than that of the auxiliary gas, this mixing zone travels downward as the filling process advances, until the mixing zone ultimately reaches the bottom of the gas container. In the reverse case, the mixing zone travels upward. The process gas/auxiliary gas mixture can be fed to a purification device when it has reached a minimum process gas concentration of 50%.

Because the thermal effects can influence the mixing of the process gas and auxiliary gas, differences in temperature between the process gas and the auxiliary gas should be taken into account. Differences in temperature can be either avoided to exclude additional influences, or intentionally introduced to generate differences in density based upon temperature differences between the process gas and the auxiliary gas.

After the fill process has been completed and the operation of the gas container has begun, a contamination of the helium may develop over time, for example, as a result of the diffusion of air through the walls of the container. In order to purify the process gas in the gas container, purified or fresh process gas that has a higher level of purity than the process gas already contained in the gas container is quiescently introduced into the gas container in such a way that no significant mixing with the contaminated process gas in the container occurs. In this process, if the contamination of the process gas has resulted in an increase in the density of the process gas, then the purified or fresh process gas is introduced into the upper area of the gas container, while at the same time the contaminated process gas is removed via suction from the lower area of the gas container. Inversely, in the case wherein a contamination of the process gas has resulted in a decrease in the density of the process gas, then the purified or fresh process gas is introduced into the lower area of the gas container, while at the same time contaminated process gas is removed via suction from the upper area of the gas container.

Finally, to empty a gas container filled with process gas, the process gas is extracted by suction from the gas container, while auxiliary gas having a lower or higher density than the process gas is quiescently introduced into the gas container in such a way that no significant mixing with the process gas occurs.

In this, if the density of the process gas is lower than that of the auxiliary gas, the process gas is removed by suction from the upper area of the gas container, while the auxiliary gas is simultaneously introduced into the lower area of the gas container. Inversely, if the density of the process gas is higher than that of the auxiliary gas, the process gas is removed by suction from the lower area of the gas container, while the auxiliary gas is simultaneously introduced into the upper area of the gas container.

To enable the quiescent introduction of the process gas into the gas container, it is preferably introduced over the cross section of the gas container or distributed at the upper and lower walls at a low flow rate. To this end, for example, so-called plate aerators or perforated tubes are provided, which extend over a majority of the gas container cross section or along the length of the gas container. The gas inlet device, which is configured expediently round or flat, is preferably positioned inside the container at the highest or lowest point of the gas container. However, gas inlet devices that are not flat are also conceivable. Accordingly, during emptying of the gas container, the auxiliary gas is also preferably distributed over the cross section of the gas container, and is introduced at a low flow rate. Similarly, during removal of the process gas it is ensured that no turbulence of the process gas takes place inside the container.

The invention is provided especially for use in very large gas containers, for example, airships, having a gas volume of more than 6,000 $m^3$, preferably more than 50,000, especially 50,000 to 2,000,000 $m^3$ (for example, 400,000 $m^3$). During the filling of this type of gas container, the process gas is preferably introduced into the gas container over approx. 10 to 100 hours at a volumetric flow rate of at least 500 $m^3_n/h$. During the purification of the process gas inside the gas container, the purified process gas is advantageously piped into the gas container and contaminated process gas is removed by suction at a volumetric flow rate of at least 500 $m^3_n/h$.

Because with very large gas containers having gas filling capacities of, for example, 400,000 $m^3$ the quantity of gas needed to fill the container cannot be provided directly via gas transport vehicles, for example, cylinder trailers, a further development of the concept of the invention envisions the process gas being intermediately stored in pressurized gas tanks, which can be filled gradually from the gas transport vehicles. In this manner, gas transport vehicles can supply the process gas, which is compressed via high-pressure compressors to, for example, 80 bar and is stored in the pressurized gas tanks, over a longer period of time. As a result, the quantity of gas needed to fill the gas container is available at any time. In this manner, even large-volume gas containers can be filled with large quantities of process gas within the shortest possible time.

When purifying the process gas in the gas container, at least two pressurized gas tanks are preferably used, at least one of which is filled with contaminated process gas from the gas container, while at least one other pressurized gas tank supplies the purified process gas to fill the gas container. In this, the contaminated process gas that is intermediately stored in the pressurized gas tank is expediently purified using a membrane purification device, and is intermediately stored as purified process gas in the pressurized gas tank. The process gas can also be purified, for example, by adsorption or rectification processes.

Overall, by using pressurized gas tanks, the time required to fill, purify, and empty large-volume gas containers, especially airships, is minimized. As a result, the down times needed by the airships can be limited to an economically acceptable duration.

The proposed method is suitable for use with all types of gases. The use in airships, the use of helium or hydrogen or a helium-hydrogen mixture is especially envisioned. The invention can, however, also be used, for example, for balloons filled with hydrogen or for large-capacity tanks, gasometers, etc. filled with helium, hydrogen, or other gases. When used in large-capacity tanks and gasometers, nitrogen is preferably used as the auxiliary gas in place of the otherwise preferred air.

The invention offers a number of advantages. For example, with the process specified in the invention, the gas container, specifically the airship, always remains tightly filled, so that changes in tension in the hull of the gas container are minimized. The principal advantage of the invention, however, consists in that the filling, purification, and emptying of the gas container can be implemented very rapidly. Thus, the cost efficiency of this system of transportation is made possible with large-volume airships, since the necessary down times can be minimized.

BRIEF DESCRIPTION OF THE DRAWING

The invention will be described in greater detail in the following with reference to an exemplary embodiment schematically illustrated in the sole FIGURE.

The sole FIGURE relates to the filling, purification, and emptying of large-volume airships having a gas holding capacity of 400,000 $m^3_n$.

DETAILED DESCRIPTION OF THE DRAWING

In this case, helium is used as the process gas, and air is used as the auxiliary gas. Before the airship 1 is filled with helium, it is first filled completely with air. To this end, air is drawn in by suction at A, and is introduced via one or more air blowers 21 and via lines 26, 20, and 19, into the airship 1. Only when the airship is completely filled with air is helium introduced into the airship 1 via one or more gas distribution device(s) 2. At the same time, the air is drawn out of the airship 1 via one or more gas distribution device(s) 18 and the lines 19, 20, and 27 by means of one or more gas blowers (21). Because the airship 1 always remains tightly filled and controlled, changes in tension in the hull of the dirigible are minimized.

In order to fill the dirigible with helium, first the necessary quantity of helium gas must be made available. To this end, compressed helium storage containers 5, 6, 7, and 8 are provided, which are gradually filled with helium, supplied by helium transport vehicles. An additional compressed helium storage tank 9 is left empty to hold contaminated helium, as described further below, which is drawn out of the airship 1 for purposes of purification.

In this exemplary embodiment, to supply the helium, trucks are preferably provided, which have liquid helium containers 10 having a holding capacity of 40,000 l (11,000

U.S. gallons). With each supply, the liquid helium container 10 is emptied, and the liquid helium is fed through an evaporator 11, whereupon the gaseous helium is fed by means of lines 12 and 13 to low-pressure compressors 14, which compress the gaseous helium to a pressure of at least 500 kPa. With a volumetric flow rate of at least 100 m$^3_n$/h, the gaseous helium is fed by means of a line 15 to high-pressure compressors, which compress the helium further to a pressure of at least 1 MPa. Finally, the highly compressed helium is fed via line 17 to one of the compressed helium storage tanks 5, 6, 7, or 8 that still has some free capacity. As an alternative, the helium may be supplied in gas cylinder transport vehicles (so-called "tube trailers") (28), which ordinarily have a supply pressure of 2 to 3 Mpa. The helium is then throttled via the line 34 or via a pressure regulator 29 to the level of pressure that exists in the line 17 lying therebehind, and the helium is piped, based upon its purity level, into one of the compressed helium storage tanks 5, 6, 7, or 8 that still has free capacity for that purity level. As soon as the pressure from the gas cylinder transport vehicle corresponds to the pressure in the line, a valve is switched over, so that the helium is then fed before the compressor 16 via lines 34 and 32 as well as a pressure-regulating valve 33. Each of the compressed helium storage tanks has a gas holding capacity of at least 50,000 m$^3_n$. The helium gas is stored in the compressed helium storage tank at a pressure of at least 1 MPa. To fill the airship 1 with a gas holding capacity of 400,000 m$^3_n$, the compressed helium storage tanks 5, 6, 7, and 8 must be filled with sufficient helium to allow a rapid filling process. If necessary, the compressed helium storage tanks may also be supplemented with liquid helium containers and/or gas cylinder transport vehicles.

While the compressed helium storage tanks may be filled from liquid helium tanks or gas cylinder transport vehicles over an extended period of time, after the compressed helium storage tank is filled the quantity of helium gas needed to fill the airship is available immediately.

Via lines 4, 13, and 3, the helium is fed from the compressed helium storage tanks 5, 6, 7, and 8 to a gas distribution device 2, which is located inside the airship 1 in the upper area of the airship 1. The gas distribution device 2 is comprised, for example, of perforated tubes, which cover, for example, approx. 40% of the upper length of the hull of the airship 1. The helium is quiescently introduced into the airship via the gas distribution device 2. In this process, care is taken to ensure that to the greatest possible extent no or only slight turbulent gas flows are generated inside the airship 1. At the same time, gas that is already present inside the airship (air, helium, or a helium-air mixture from the mixing zone) is drawn out of the lower area of the airship via a gas distribution device 18. In this process, care is also taken to ensure that to the greatest possible extent no or only very slight turbulence occurs in the volume of gas inside the airship, and that the airship 1 remains tightly filled. The quantity of gas drawn off via the gas distribution device 18 is replaced with the quantity of helium introduced via the gas distribution device 2, without the occurrence of any significant mixing of the introduced helium with the gas that is already present inside the airship 1.

The quantities of removed gas, comprised predominantly of air or air-helium mixtures, which due to a low helium concentration cannot be fed to the membrane purification device 24, are released into the atmosphere via the gas distribution device 18, the lines 19, 20, the air blower 21, and the line 27. The quantities of removed gas that contain a sufficient helium concentration for a purification process can be subjected to a direct purification process (via the gas distribution device 18, the lines 19, 22, the compressor 14, the line 25, the purification device 24, the line 23, the compressors 14, the line 15, the compressor 16, the line 17, and into one of the open pressure tanks for pure helium 5-9) or an indirect purification process (via the gas distribution device 18, the lines 19, 22, the compressor 14, the line 15, the compressor 16, the line 17, into an open pressure tank for impure helium 5-9, then via a line 4, 30, the pressure regulator 31, the line 25, the purification device 24, the line 23, the compressors 14, the line 15, the compressor 16, the line 17, and into one of the open pressure tanks for pure helium 5-9).

During the course of the operation of an airship, the process gas becomes contaminated due to diffusion processes, which has the effect of an undesirable reduction in uplift. When a maximum air contamination of 5%, for example, has been reached in the helium filling of the airship 1, which corresponds to a 5% reduction in uplift, the gas content of the airship 1 must be purified to, for example, at least 98% helium. To this end, helium of sufficient purity is drawn from one of the compressed helium storage tanks 5, 6, 7, or 8 with, for example, up to 40,000 m$^3_n$/h and quiescently introduced via the lines 4, 13 and 3 and via the gas distribution device 2 into the upper section of the airship 1, while, at the same time, contaminated helium is removed by suction from the lower section of the airship 1 via the gas distribution device 18 and lines 19 and 22, through the compressors 14 and 16, and is intermediately stored in an empty compressed helium storage tank 9. The compressed helium storage tanks 5, 6, 7, and 8 are gradually emptied to fill the airship 1, and the compressed helium storage tanks 9, 8, 7, and 6 are again filled with contaminated helium from the airship 1. In this manner, the gas content of the airship 1 can be completely exchanged, so that in the end the airship 1 is completely filled with helium of sufficient purity, while four of the compressed helium storage tanks are filled with contaminated helium and one compressed helium storage tank again remains empty. In this manner takes place a rapid exchange of the gas filling inside the airship 1, while the actual purification of the helium can be performed when the airship is already back in operation.

To purify the helium, the contaminated helium is removed from the compressed helium storage containers and fed via lines 4 and 13 and via the compressor 14 and the line 25 to a membrane purification device 24. The membrane purification device is designed such that, with a flow rate of at least 100 m$^3_n$/h, the helium can be purified from a purity level of at least 50% to at least 95%. The helium purified in this manner is fed via the line 23 to the compressors 14, and further via the line 15 to the compressors 16, where it is compressed to a pressure of at least 1 MPa, and finally it is fed via line 17 into an open compressed helium storage tank 5, 6, 7, or 8. In this manner, the pressure tanks 6, 7, 8, and 9 that are filled with contaminated helium are gradually emptied, the helium is purified in the membrane purification device 24, and the compressed helium storage tanks 5, 6, 7, and 8 are again filled with purified helium. In the end, four of the compressed helium storage tanks contain purified helium, while another is again empty.

If the gas content of the airship 1 is to be completely emptied, for example to allow maintenance work, then, in a reversed process, the helium is removed by suction from the top via the gas distribution device 2, while air is simultaneously fed in at the bottom via the gas distribution device 18. The helium that is drawn off by suction via the line 3 and the compressors 14 and 16 is intermediately stored in the compressed helium storage tanks.

What is claimed is:

1. A method for filling large-volume gas containers with a process gas, comprising:
   first filling a gas container with an auxiliary gas that has a higher or lower density than the process gas; and
   quiescently introducing the process gas into the gas container so that no significant mixing with the auxiliary gas occurs,
   wherein if the density of the process gas is lower than that of the auxiliary gas, the process gas is introduced into an upper area of the gas container, while the auxiliary gas, or a mixture of auxiliary gas and process gas, is simultaneously removed by suction from a lower area of the gas container,
   wherein if the density of the process gas is higher than that of the auxiliary gas, the process gas is introduced into the lower area of the gas container, while the auxiliary gas, or a mixture of auxiliary gas and process gas, is simultaneously removed by suction from the upper area of the gas container.

2. A method according to claim 1, wherein the container is an airship.

3. A method according to claim 1, wherein the process gas is introduced at a low flow rate.

4. A method according to claim 1, wherein the auxiliary gas is introduced at a low flow rate.

5. A method according to claim 1, wherein the gas container has a gas volume of more than 50,000 m$^3$.

6. A method according to claim 5, wherein, when purifying the process gas contained in the gas container, the process gas having the higher purity level is introduced into the gas container at a volumetric flow rate of at least 500 m$^3_n$/h.

7. A method according to claim 1, wherein filling of the gas container with the process gas is at a volumetric flow rate of at least 500 m$^3_n$/h.

8. A method according to claim 1, wherein a difference between densities of the auxiliary gas and the process gas is at least 15%.

9. A method according to claim 1, wherein the process gas comprises a gas or gas mixture having a lower density than air.

10. A method according to claim 9, wherein the process gas is helium, hydrogen, or a helium-hydrogen mixture.

11. A method according to claim 1, wherein the auxiliary gas is a gas or gas mixture with a density which is equal to or higher than air.

12. A method according to claim 1, wherein the auxiliary gas is air.

13. A method according to claim 1, further comprising intermediately storing the process gas in compressed gas tanks, so that sufficient quantities of process gas are available for filling the gas container.

14. A method according to claim 13, wherein, when purifying the process gas contained in the gas container, at least two compressed gas tanks are used, at least one of which is filled with contaminated process gas from the gas container or from a gas cylinder transport vehicle, while purified process gas is taken from at least one other gas tank for filling the gas container.

15. A method according to claim 14, further comprising purifying the intermediately stored contaminated process gas in the compressed gas tanks is purified by adsorption, rectification, or membrane filtration; and
   intermediately storing the purified process gas in the compressed gas storage tanks.

16. A method for purifying the process gas contained in a large-volume gas container, comprising:
   quiescently introducing a process gas having a higher purity level than process gas already in the gas container into the gas container so that no significant mixing with contaminated process gas present in the gas container occurs,
   wherein, if contamination of the process gas resulted in an increase in the density of the process gas, then the process gas with the higher purity level is introduced into an upper area of the gas container, while contaminated process gas is simultaneously removed by suction from a lower area of the gas container,
   wherein if contamination of the process gas resulted in a reduction in the density of the process gas, then the process gas having a higher purity level is introduced into the lower area of the gas container, while contaminated process gas is simultaneously drawn off by suction from the upper area of the gas container.

17. A method according to claim 16, wherein the container is an airship.

18. A method for emptying large-volume gas containers filled with process gas, comprising:
   removing process gas by suction from the gas container, while auxiliary gas having a higher or lower density than the process gas is quiescently introduced into the gas container so that no significant mixing with the process gas occurs,
   wherein if the density of the process gas is lower than that of the auxiliary gas, the process gas is removed by suction from an upper area of the gas container, while the auxiliary gas is simultaneously introduced into a lower area of the gas container,
   wherein if the density of the process gas is higher than that of the auxiliary gas, the process gas is removed by suction from the lower area of the gas container, while the auxiliary gas is simultaneously introduced into the upper area of the gas container.

19. A method according to claim 18, wherein the container is an airship.

* * * * *